3,155,524
PROCESS FOR INCREASING WATER ABSORPTION OF SOYBEAN MATERIAL
Frank A. Norris, La Grange Highlands, and David C. Johnson, Naperville, Ill., assignors to Swift & Company, Chicago, Ill., a corporation of Illinois
No Drawing. Filed Sept. 10, 1962, Ser. No. 222,634
9 Claims. (Cl. 99—98)

The instant invention relates to the treatment of extracted soybean material, more particularly it relates to a process for the production of an improved soybean flake product having an increased moisture absorption.

Commercially satisfactory soybean meal generally has a moisture content of about 12%. Heretofore it has been difficult to maintain this moisture content in the soybean meal due to the drying out of the meal during shipment or while on inventory. These difficulties can be overcome by treatment of soybean meal according to the instant process. This treatment causes the meal to have an increased moisture absorption, and thus lose moisture less readily, thereby enabling moisture contents in general to be kept nearer the optimum and eliminating the problems of short weights arising from moisture loss during shipment.

It is therefore an object of this invention to provide a process for the treatment of spent soybean flakes which enables the production of soybean meal having increased moisture absorbing properties.

Another object of the invention is the production of a soybean meal having improved moisture absorption resulting from the treatment of the extracted soybean flakes with an alkali material.

Still another object of the invention is the production of an improved soybean material having increased moisture absorption, resulting from the use of short heating times in toasting the soybean flakes.

A further object of the invention is to provide a process which enables the production of a soybean meal having a suitable color, even though short heating times are used in toasting the soybean flakes.

Additional objects and advantages of the invention will become readily apparent to one skilled in the art from the following detailed description.

The invention is concerned generally with a process for the treatment of soybean materials and comprises the steps increasing the pH of spent soybean flakes before desolventizing and toasting, and heating the treated flakes for a relatively short period of time. Flakes which have been treated by this process have greatly improved water absorption properties, and also exhibit a color which is commerically desirable.

The process is carried out on soybean flakes which have already been extracted to remove the oil therefrom. Such soybean flakes are known as spent flakes. There are numerous reasons why the instant process cannot be satisfactorily applied to unextracted fat containing soybean flakes. The principal reason is that soap gets into the oil from reaction of the alkali treatment agent with the free fatty acids in the soybean flakes, raising problems of solvent recovery and soap removal before the oil can be sold. The following table illustrates the effect of the use of unextracted soybean flakes in the instant process on the amount of soap in the oil product. In this series of tests 1000 grams of raw soybean flakes were treated with 1% sodium carbonate, based on the calculated weight of the spent flakes. In test I, the flakes had not been extracted before the alkali treatment, while in test II they had been extracted.

TABLE 1

| | pH | Free Fatty Acid | Centrifuge Loss | Percent Soap in Oil | P.p.m. Sodium |
|---|---|---|---|---|---|
| Test I Control | 6.4 | 0.8 | 2.06 | 0.03 | 27 |
| Test I Treated | 7.3 | 0.4 | 1.76 | 0.27 | 216 |
| Test II Control | 6.4 | 0.8 | | 0.03 | 27 |
| Test II Treated | 7.3 | 0.5 | | 0.14 | 112 |

In the above table, the free fatty acid is that present before the alkali treatment. The centrifigue loss in the above table is a measure of the non-neutral oil material present in the crude oil. Under the conditions of this test all of the neutral oil is spared, but all of the impurities are removed. Consequently, the refining loss accompanying the use of our method is the lowest refining loss obtainable. The p.p.m. (parts per million) of sodium in the table represents that present in the oil, and is another measure of the soap present in the oil.

In addition to overcoming the soap problem, the use of spent flakes in the instant process produces a light color in the final product. Flakes which are treated in accordance with the instant process after the oil has been extracted therefrom, have a desirable color even at the short heating times contemplated by the instant invention. If the alkali is added before extraction its darkening effect is minimized and the resulting meal is undesirably light in color. The application of the instant process to unextracted soybean flakes is further unsatisfactory due to the fact that cooked soybean flakes do not extract well unless dried considerably below the moisture used in cooking and carefully conditioned. Cooking the soybean flakes prior to extraction also produces many "fines" which slow down solvent circulation rates and impair extraction efficiency. In some cases extraction may be impossible if it is preceded by cooking. Further, the cost of processing is increased since cooking must later be repeated in order to remove the solvent from the extracted flakes.

One of the steps in the instant process for producing a soybean meal having a high moisture absorption is the increasing of the pH of spent soybean flakes before desolventizing and toasting. The effect of increasing the pH on the percent moisture absorption of the soybean product is shown by the following table. The flakes used in these tests were treated at 20% moisture for 30 minutes under 25 pounds jacket steam pressure.

TABLE 2 pH:                       Percent moisture absorbed
  6.4 (control) _____ 177
  7.6 _____ 208
  8.4 _____ 222
  9.4 _____ 214
  10.7 _____ 257

Generally any basic substance can be used to increase the pH of the soybean materials in order to improve the moisture absorption of the resultant product. Particularly useful basic materials are aqueous solutions of sodium or other alkali metal hydroxides, sodium or other alkali metal carbonates, tri-sodium phosphate, ammonia gas, or lime. Increasing the pH by the addition of an alkaline material is critical in the production of soybean meal having an increased moisture absorption. The addition of an acid, lowering the pH, results in a decrease in moisture absorption. For example, if the pH is lowered to 4.2 by the addition of acid the moisture absorption is reduced to 132%, under the same processing conditions used in Table 2 above.

The addition of the alkaline or basic material has the further effect of eliminating urease activity in the soybean material. This effect is also beneficial since there is an increasing commercial demand for soybean meal having a low urease activity.

Although it can readily be seen from the above table that an increase of the pH to any value within the basic pH range improves the moisture absorption properties of the resultant soybean meal product, it is preferable to increase the pH into the range of about 7.0 to about 9.0.

Another feature of the instant invention is the use of short heating or cooking times in processing the soybean materials after the alkali treatment has been conducted.

The use of very short heating times has been found to increase the moisture absorption properties of the soybean meal product. The use of short heating times has heretofore been impossible since the soybean product produced using short heating times had a commercially unacceptable light color. However, the use of short heating times in the instant process, coupled with the alkali treatment of the spent soybean flakes produces a commercially acceptable product. The following tables illustrate the effect of shorter heating times on the moisture absorption of the soybean meal produced by the instant process.

TABLE 3

| Raw Material and Conditions | Percent Moisture Absorption | | |
|---|---|---|---|
| | 10 Mins. | 30 Mins. | 50 Mins. |
| S.B. spent flakes at 173° F | 220 | 213 | 196 |
| S.B. flakes spent at 188° F | 212 | 193 | 175 |
| S.B. flakes spent at 220° F | 200 | 192 | 174 |

Table 3 shows that at various temperatures the moisture absorption of the soybean flakes increases as shorter heating times are used. Thus at a temperature of 188° F., flakes heated for 10 minutes had a moisture absorption of 212%, while those heated for 30 minutes had a moisture absorption of 193%, and those heated for 50 minutes had an absorption of only 175%.

This increase in absorption as heating time is decreased also occurs as the pH is varied over the alkaline range, as is shown by Table 4.

TABLE 4

| Raw Material and Conditions | Percent Moisture Absorption | | |
|---|---|---|---|
| | 10 Mins. | 30 Mins. | 50 Mins. |
| S.B. spent flakes pH 7.5–220° F | 212 | 207 | |
| S.B. spent flakes pH 8.5–220° F | 226 | 216 | |
| S.B. spent flakes pH 10.0–220° F | 265+ | 235 | |

The short heating times comprehended by the instant invention also include flash drying of the treated meal. A preferred range of heating times is from about 5 minutes to about 15 minutes. The heating is not conducted dehydratively, since it is preferred to do all the reacting at a high moisture concentration and then flash off or otherwise quickly dry the treated meal. This moisture content during the treatment may be achieved commercially by the condensation of live steam on the solvent extracted flakes. This would simultaneously remove the solvent and raise the moisture content without requiring the addition of large amounts of water with the alkali.

The following examples are provided to illustrate our process and are not intended to limit the scope of the invention other than as indicated in the appended claims.

*Example 1*

1,000 grams of soybean flakes (pH 6.4) were placed in a Hobart laboratory mixer, and 32 ml. of 20% sodium hydroxide (mixed with enough water to bring the moisture content up to 20%) were added. The pH was thereby raised by 7.6. The mixed product was placed in a steam jacketed reactor at 220° F. and kept under agitation for 30 minutes. At the end of this time, the temperature had reached 225° F. and the moisture content had dropped to 17.7%, pH 7.5. This product on drying down to 8% moisture, had a water absorption of 208% compared to 177% for a control run which was made under exactly the same conditions except that no alkali was used. In the control run, the moisture out of the reactor was 16.2%, which indicates that flakes treated with alkali retained moisture more strongly, and that the retention increases as the pH is raised.

*Example 2*

1,000 grams of spent soybean flakes (pH 6.4) were placed in the Hobart mixer and 108 ml. of sodium hydroxide added (with sufficient water so that the final moisture content of the mixture was 20%), thereby raising the pH to 10.7. The mix was placed in a reactor at 220° F. for 30 minutes, at the end of which time temperature had risen to 225° F. The moisture out of the reactor was 19.2%, and the pH was 10.0. The water absorption of flakes so treated was 257%, compared to 177% for the control flakes.

*Example 3*

1,000 grams of spent soybean flakes (pH 6.4) were placed in a Hobart mixer and a dilute solution of ammonium hydroxide added to raise the pH to 7.5, while at the same time bringing the final moisture content to 20%. The mix was placed in a pressure cooker at 220° F. for 30 minutes, at the end of which time the temperature had risen to 227° F. After reaction, the pH was 7.3 and the water absorption of the sample (after drying to 10% moisture) was 192%. A control run made with identical flakes but without the use of ammonia showed a pH of 6.4 before and after treatment, and a final moisture absorption of 175%.

*Example 4*

1,000 grams of spent soybean flakes were placed in a Hobart mixer and a dilute lime slurry added so as to bring the pH of the mix to 7.5 while at the same time, increasing the moisture content to 20%. The mixture was placed in the reactor at 220° F. for 30 minutes at the end of which time the temperature had risen to 224° F. The pH was unchanged after reaction, but the moisture absorption was 196% as compared to 174% for a control run in which no lime was used.

*Example 5*

1,000 grams of spent soybean flakes (pH 6.4) were placed in a Hobart mixer and 1% of sodium carbonate (based on the weight of spent flakes) added in a water solution sufficient to increase the moisture content of the mix to 20%. The pH of the mix was 7.4 before cooking, and 7.6 afterwards. Cooking was done in a reactor at 220° F. with 30 minutes reaction time. Water absorption of the resulting product was 197% as compared to 177% for a control sample.

In a similar experiment when 2% sodium carbonate was used, bringing the pH to 8.5 (8.6 after cooking), the moisture absorption was 210%. Similarly, when 4% sodium carbonate was added in an amount sufficient to bring the pH to 9.5 before cooking (9.9 after cooking), the moisture absorption was increased to 233%. The absorption of control flakes identical with the ones used in these experiments was 177%.

*Example 6*

1,000 grams of spent soybean flakes were placed in a Hobart mixer and a solution of trisodium phosphate added sufficient to bring the pH of the mix up to 7.5 while at the same time increasing the moisture content to 20%. After 30 minutes heating in a reactor, at 220° F. the pH was unchanged, but the resulting product had a moisture absorption of 201% as compared to 177% for a control sample similarly processed but without the addition of any trisodiumphosphate.

The following example illustrates the water retention properties of soybean meal treated by the instant process, as compared to untreated control soybean meal.

*Example 7*

A sample of control soybean meal and one of sodium carbonate treated meal were stored side by side in a desiccator which was maintained at relative humidity of 62%. Originally, the control soybean meal had a higher moisture content than the treated meal, but as storage progressed the moisture content in the control meal decreased while that in the treated meal increased. After 12 days of storage, at which time it was apparent that equilibrium had been obtained, the moisture content of the control meal was 10.53%, while the moisture content of the carbonate treated meal was 10.96%. The treated meal's holding approximately ½% more moisture indicates that it would lose water less readily and, thus, produce fewer short-weight problems.

Obviously, many modifications and variations of the invention as hereinbefore set forth may be made without departing from the spirit and scope thereof, and, therefore, only such limitations should be imposed as are indicated in the appended claims.

We claim:

1. A process for the production of soybean material having increased moisture absorption comprising: treating extracted soybean material having a pH of below 7.0 with an aqueous basic material selected from the group consisting of alkali metal hydroxides, alkali metal carbonates, tri-sodium phosphate, ammonium hydroxide and lime, thereby raising the pH of said soybean material to above 7.0 and increasing the moisture content of said material; and heating said treated material from about 5 to about 30 minutes.

2. The process of claim 1 wherein the aqeous basic material is an alkali metal carbonate.

3. The process of claim 2 wherein the moisture content of the soybean material is raised to not more than 20% and the treated soybean material is heated from about 5 to about 15 minutes.

4. A process for the production of soybean material having increased moisture absorption comprising: treating extracted soybean flakes having a pH of below 7.0 with an aqueous basic material selected from the group consisting of alkali metal hydroxides, alkali metal carbonates, tri-sodium phosphate, ammonium hydroxide and lime, thereby raising the pH of said soybean flakes to above 7.0 and increasing the moisture content of said flakes; heating said treated flakes from about 5 to about 30 minutes; and flash drying said treated flakes.

5. The process of claim 4 wherein the pH is increased to between about 7.0 and about 9.0.

6. A process for the production of soybean flakes having increased moisture absorption comprising: treating extracted soybean flakes having a pH of below 7.0 with a basic material selected from the group consisting of alkali metal hydroxides, alkali metal carbonates, tri-sodium phosphate, ammonium hydroxide and lime, thereby raising the pH of said soybean flakes to above 7.0; and condensing live steam on said treated flakes for from about 5 to about 30 minutes.

7. A process for the production of soybean material having increased moisture retention comprising: treating extracted soybean flakes having a pH of below 7.0 for from about 5 to about 30 minutes with condensing steam and a basic material, said basic material selected from the group consisting of alkali metal hydroxides, alkali metal carbonates, tri-sodium phosphate, ammonium hydroxide and lime, thereby raising the pH of said flakes to above 7.0 and increasing the moisture content of said flakes; and flash drying said treated flakes.

8. The process of claim 7 wherein the soybean material is treated from about 5 to about 15 minutes.

9. A process for the production of soybean material having increased water retention comprising: treating extracted soybean flakes having a pH of below 7.0 with an aqueous solution of an alkali metal hydroxide, thereby raising the pH of said flakes to between about 7.0 and about 9.0 and raising the moisture content of said flakes; and heating said treated flakes for from about 5 to about 30 minutes.

References Cited in the file of this patent

UNITED STATES PATENTS

| | | |
|---|---|---|
| 2,524,991 | Renner | Oct. 10, 1950 |
| 2,585,793 | Kruse | Feb. 12, 1952 |
| 2,881,076 | Sair | Apr. 7, 1959 |
| 2,881,159 | Circle et al. | Apr. 7, 1959 |